United States Patent [19]

Gottfried

[11] Patent Number: 4,691,585
[45] Date of Patent: Sep. 8, 1987

[54] GEAR SHIFT DEVICE

[75] Inventor: Achberger Gottfried, Friedrichshafen, Fed. Rep. of Germany

[73] Assignee: Zahnradfabrik Friedrichshafen AG, Friedrichshafen, Fed. Rep. of Germany

[21] Appl. No.: 859,088
[22] PCT Filed: Jul. 19, 1985
[86] PCT No.: PCT/EP85/00357
    § 371 Date: Apr. 2, 1986
    § 102(e) Date: Apr. 2, 1986
[87] PCT Pub. No.: WO86/01161
    PCT Pub. Date: Feb. 27, 1986
[51] Int. Cl.⁴ .......................... G05G 9/16; G05G 9/02
[52] U.S. Cl. .......................... 74/473 R; 74/471 XY
[58] Field of Search .......... 74/471 XY, 473 R, 473 P, 74/471 R; 137/636.2

[56] References Cited

U.S. PATENT DOCUMENTS

| | | | |
|---|---|---|---|
| 2,207,797 | 7/1940 | Guier | 74/473 |
| 2,547,317 | 4/1951 | Gustafson | 74/473 R |
| 3,805,635 | 4/1974 | Grosseau | 74/473 P |
| 4,060,005 | 11/1977 | Bost | 74/471 XY |
| 4,187,737 | 2/1980 | Mori et al. | 137/626.2 X |
| 4,283,964 | 8/1981 | Grattapaglia | 74/471 XY |
| 4,285,250 | 8/1981 | Lizuka et al. | 137/636.2 X |
| 4,509,384 | 4/1985 | Larry et al. | 74/473 R |
| 4,523,488 | 6/1985 | Ahrendt | 137/636.2 X |
| 4,524,635 | 6/1985 | Hulin et al. | 74/473 R |
| 4,526,204 | 7/1985 | Primdahl | 74/471 XY |
| 4,583,417 | 4/1986 | Hurlow | 74/473 R |

FOREIGN PATENT DOCUMENTS 2045777 7/1971 Fed. Rep. of Germany.

Primary Examiner—Cornelius J. Husar
Assistant Examiner—Peter M. Cuomo
Attorney, Agent, or Firm—Karl F. Ross; Herbert Dubno

[57] ABSTRACT

Gear shift device for geared vehicular transmission with a rotating shaft vertically disposed in a housing with a coupling lever fastened to the upper end of the former and arranged outside of the housing and with a manual gear shift lever above the rotating shaft linked near its axis to the housing in the manner of a universal joint. The connecting linkage between the rotating shaft and the manual shift lever consists in essence of a connecting shaft journaled in the longitudinal direction of the vehicle near the axis on housing and a bell crank in an essentially vertically oriented axis. On the other end of connecting shaft is the manual shift lever journaled in an essentially horizontal axis transverse to the axes of the bell crank, the rotating shaft and the connecting shaft. The two lever arms of the bell crank are connected via universal joints with the coupling lever of the rotating shaft and one coupling arm of the manual shift lever, respectively.

7 Claims, 8 Drawing Figures

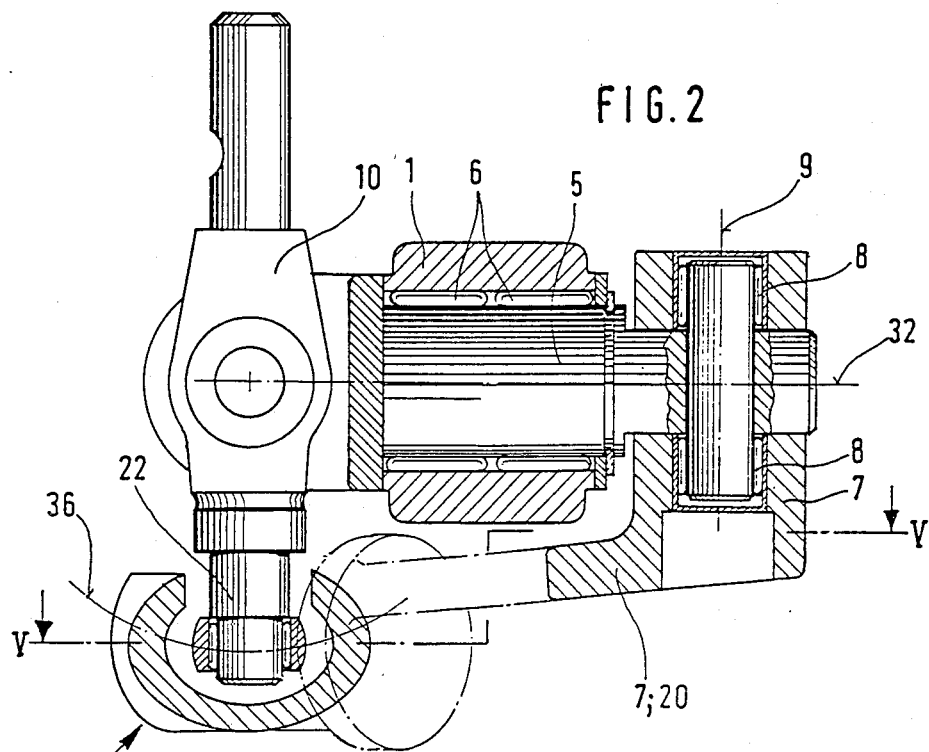
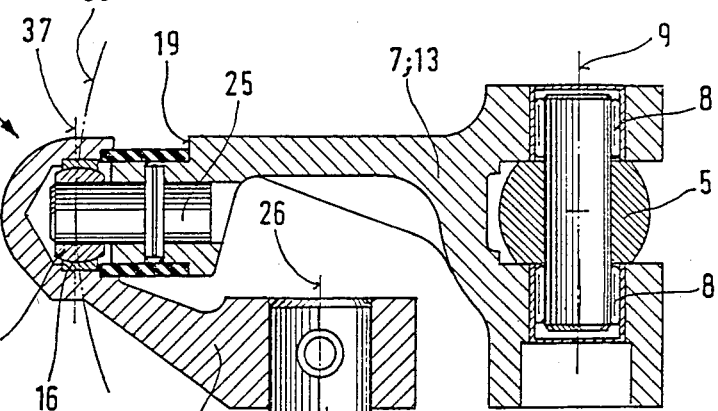
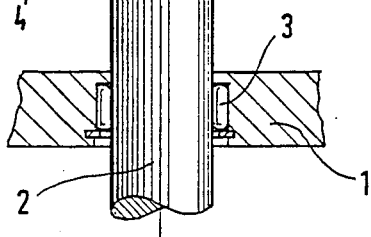
FIG. 2
FIG. 3

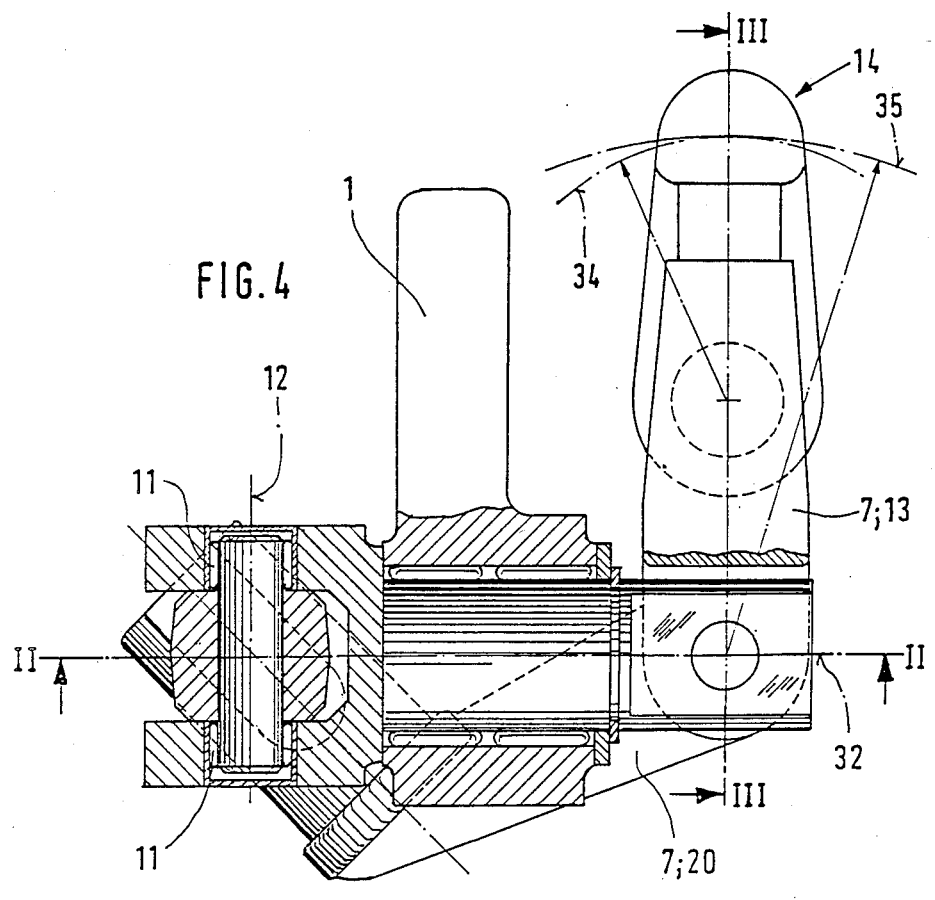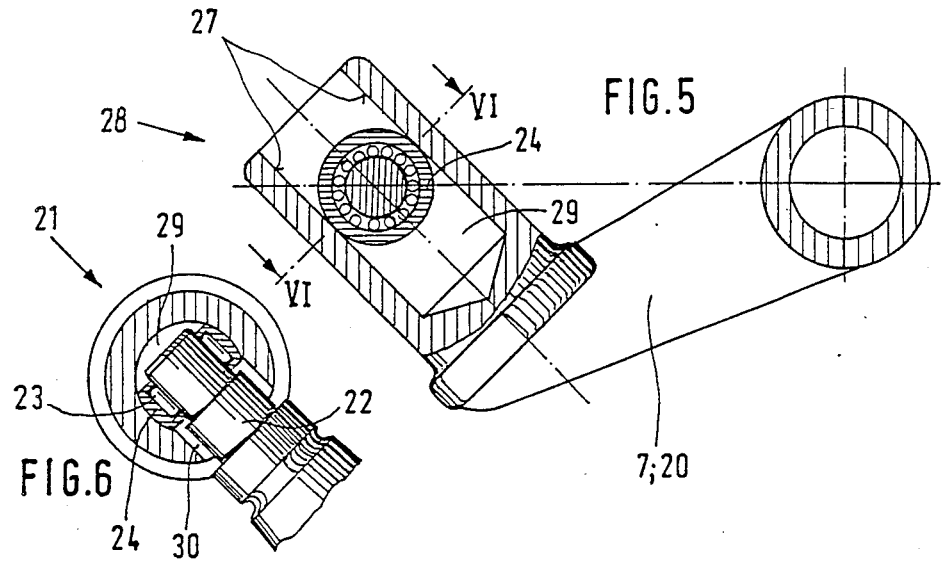

GEAR SHIFT DEVICE

CROSS-REFERENCE TO RELATED APPLICATION

This application is a national phase application corresponding to the International Application PCT/EP No. 85/00357, filed July 19, 1985 and based in turn upon the Luxemburg application PCT/EP No. 84/00237 of Aug. 4, 1984, the priority of which has been claimed.

FIELD OF THE INVENTION

The invention concerns a gear shift device, in particular for geared vehicular transmissions, with a rotating shaft vertically disposed in a housing, with a coupling lever fastened to the upper end of the former and arranged outside the housing, with a manual shift lever above the rotating shaft and linked to the housing in the manner of a universal joint, and with a connecting linkage between the manual shift lever and the rotating shaft.

BACKGROUND OF THE INVENTION

A device of this kind is known (DE-AS No. 26 55 263).

In FIG. 1 of the drawing of DE-AS No. 26 55 263 there is shown a connecting linkage between a rotating shaft arrayed vertically in a housing, with a coupling lever arrayed on the upper end of the former, and a manual shift lever above the rotating shaft linked to the housing in the same manner as universal joint. The shift and selection motions are transmitted from the manual shift lever by means of a shifting shaft which is supported by a linkage support connected to the shifting shaft and the housing via ball and socket joints to the shifting shaft and the housing, and which is arrayed near the rotating shaft and essentially parallel to the rotating shaft.

A connecting linkage of this type is feasible when there is sufficient horizontal distance between the manual shift lever and the rotating shaft, when the length of the shifting shaft is sufficiently large with respect to the length of the coupling lever. The center of the knob of the manual shift lever and the center of the articulation between the shift rod and the coupling lever describe essentially the same space curves; the distortion remains small. However, this distortion increases with decreasing horizontal distance between the manual shift lever and the rotating shaft. When the distance becomes very small, a connecting linkage according to DE-AS No. 26 55 263 is no longer feasible.

OBJECT OF THE INVENTION

It is the object of the invention to provide a gear shift device as described but where a manual shift lever is positioned with very little horizontal distance from the rotating shaft and linked to rotating shaft with the fewest possible connecting elements in such manner that the center of the knob of the manual gear shift lever and the center of the universal joint on the coupling lever describe similar space curves with only little distortion.

SUMMARY OF THE INVENTION

These objects are attained with a gear shift device of the aforedescribed type wherein the manual shift lever and the bell crank are journaled on a common connecting shaft at a distance from one another for rotation about axes which cross each other. The connecting shaft is journaled on the housing at a short distance from an axis of the rotating shaft. A first lever arm of the bell crank is connected to the coupling lever or rotating shaft via a first universal joint which is fixedly connected to one of the two levers, and is rotatable and axially translatable with respect to the other lever while a second lever arm of the bell crank is connected to a coupling arm of the manual shift lever via a second universal joint which is disposed on one of the arms so as to be axially translatable, or fixed, and is movable with respect to the other arm along a slant or inclined guide on the other arm.

The rotating shaft is journaled in the housing in two anti-friction bearings rotatably, and axially translatably in a sliding manner.

The connecting shaft is journaled on the housing in two permanently lubricated and sealed anti-friction bearings in an axially fixed manner.

The manual shift lever and the bell crank on connecting shaft are journaled in an axially fixed manner each in two permanently lubricated and sealed anti-friction bearings.

The first universal joint can be a spherical sliding bearing with a spherical ring and a hollow spherical ring.

The second universal joint can be an anti-friction bearing with a spherical outer race, the slant guide is a bore in one of the two arms connected via the second universal joint with a slot running along the bore through which the other arm protrudes with the anti-friction bearing axially translatable thereon, and the spherical outer race rolls along the bore of the slant guide.

The second universal joint can also have an anti-friction bearing with a spherical outer race and a cage axially fixed to this outer race, with rolling elements, and, the slant guide can be an elongated hole wherein one of the two arms connected via the second universal joint protrudes with the anti-friction bearing fixed thereon. The spherical outer race rolls along the elongated hole of the slant guide. An elastomeric sleeve can enclose the second universal joint and connect the two arms associated therewith.

BRIEF DESCRIPTION OF THE DRAWING

In the drawing, two embodiments of the invention are shown.

In the drawing:

FIG. 2 is a detail view of a portion of this device, likewise in section, the section being taken along line II—II of FIG. 4;

FIG. 3 is another detail in cross section, the section being taken alone line III—III of FIG. 4;

FIG. 4 is a section in a plane of the shaft axis of the device of FIG. 1;

FIG. 5 is a section along line V—V of FIG. 2;

FIG. 6 is a section along line VI—VI of FIG. 5;

Figure 1:
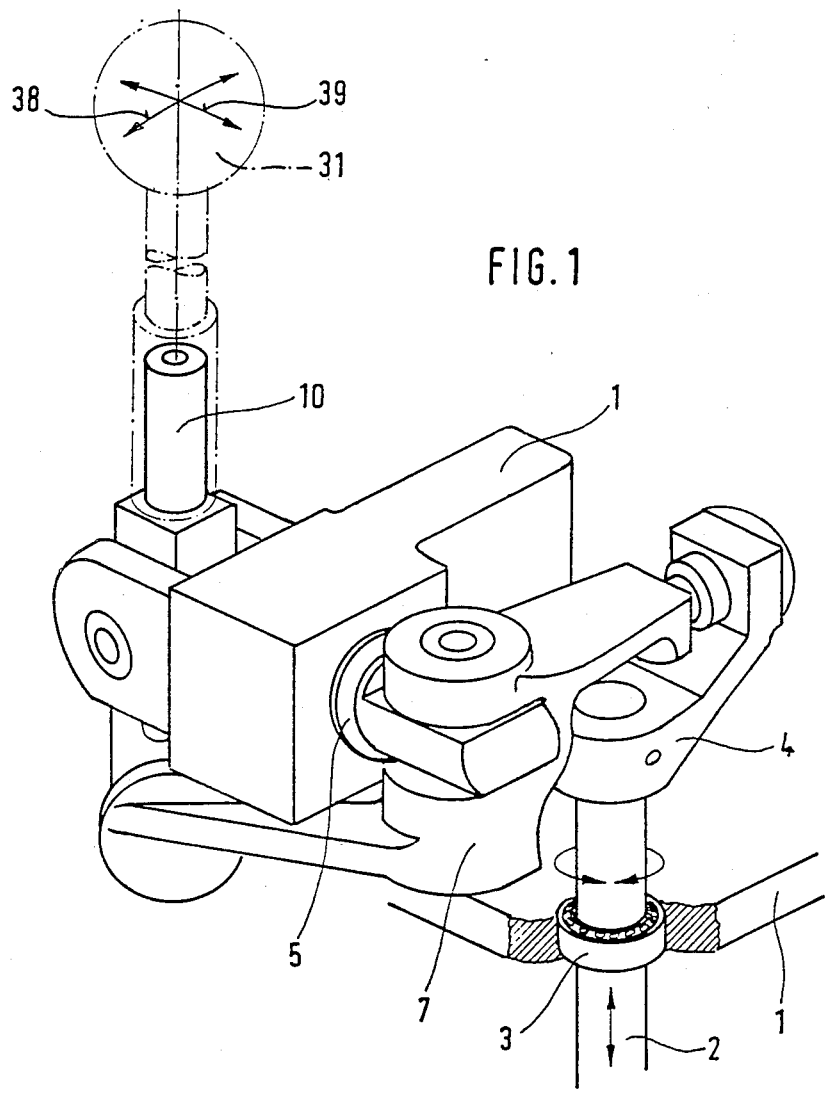
FIG. 1 is a prospective view, partly broken away of a first embodiment of a gear shift device according to the invention.
Figure 8:
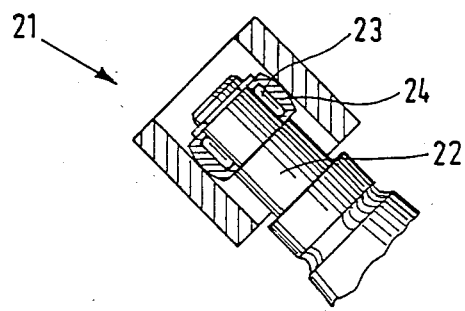
FIG. 8 is a section along line VIII—VIII of FIG. 7.
Figure 7:
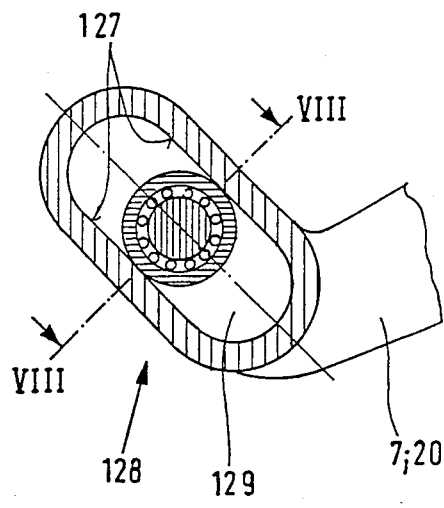
FIG. 7 illustrates another embodiment of the inclined guide which can be used with a device otherwise identical to that of FIGS. 1-6.

In a housing 1, a vertically positioned rotating shaft 2 is journaled in two anti-friction bearings 3- (the illustration shows only the upper of the two anti-friction bearings 3); capable of rotating and sliding axially. On the upper end of rotating shaft 2, outside of housing 1, a coupling lever 4 is fastened. Transverse to rotating shaft 2 and near coupling lever 4 a connecting shaft 5 is journaled in housing 1 by means of two anti-friction bearings 6, rotatable but axially fixed. On one end of the connecting shaft 5 a bell crank 7 is journaled in two anti-friction bearings 8, rotatable but axially fixed, along an axis 9 which extends essentially parallel to rotating shaft 2. On the other end of the coupling shaft 5 a manual shift lever 10 is journaled in two anti-friction bearings 11, rotatable and axially fixed in an axis 12 which extends transverse to axis 9 and thus also to rotating shaft 2. A first lever arm 13 of the bell crank 7 is connected to the coupling lever 4 via a first universal joint 14. The universal joint 14 consists of a spherical ring 15 and a hollow spherical ring 16. The spherical ring 15 slides within a hollow spherical ring 16 and axially on pin 25 which is rigidly connected to arm 13. The hollow spherical ring 16 seats rigidly in a bore 17 of the coupling lever 4. The (universal) joint 14 is sealed toward the exterior by an elastomeric sleeve 18 between the hollow spherical ring 16 and a shoulder 19 on arm 13. A second lever arm 20 of the bell crank 7 is connected with a coupling arm 22 on the lower end of the manual shift lever 10 via a second universal joint 21. The universal joint 21 is an anti-friction bearing 23 with a spherical outer race 24. The ooter race 24 rolls along a wall 27 or 127 with little play between it and an opposite parallel wall 27 or 127 of a slant guide 28 or 128 which consists of a bore 29 with a lateral slot 30 or of an elongated hole 129 at the end of arm 20. The anti-friction bearing 23 is axially movable on coupling arm 22 (FIGS. 1 to 6) or is axially fixed 7, (FIGS. 7 and 8). Universal joint 21 is enclosed in an elastomeric sleeve 35 (not shown), which connects the coupling arm 22 of the manual shift lever 10 with the arm 20 of bell crank 7. The connecting shaft 5 is positioned in the longitudinal axis of the vehicle. The manual shift lever 10 carries on its upper end a knob 31.

When knob 31 is moved transversely to the longitudinal direction of the vehicle (double arrow 38), the connecting shaft 5 and with it the bell crank 7 with its arm 13 rotates about axis 32 of the connecting shaft 5, universal joint 14 moves between arm 13 and the coupling lever 4 in vertical direction, and the rotating shaft 2 is translated axially. Direction and length of the path of (universal) joint 14 are determined by a slot (not shown) fixed in the housing and a guide pin (not shown) guided in this slot and fixed with respect to the rotating shaft. The spherical ring 15 of the universal joint 14 slides axially upon pin 25, because this pin 25 moves in a circular arc 33 concentric with connecting shaft 5 and (universal) joint 14 moves in a straight line 37 parallel to axis 26 of rotating shaft 2. When knob 31 is moved in the direction of the longitudinal axis of the vehicle (double arrow 39), then outer race 24 of anti-friction bearing 23 of (universal) joint 23 rolls along wall 27 or 127 of slant guide 28 or 128 on the end of arm 20 of bell crank 7, bell crank 7 rotates about its axis 9, universal joint 14 between the arm 13 and the coupling lever 4 moves in a circular arc 34 concentric with rotating shaft 2, and rotating shaft 2 is rotated. Direction and length of the path of universal joint 14 are determined by a guide slot (not shown) fixed in the housing and a guide pin (not shown) guided in this guide slot fixed with respect to the rotating shaft. The spherical ring of universal joint 14 slides axially upon arm 13, because this arm 13 moves in a circular arc 35 concentric with axis 9 of bell crank 7, and thus in a somewhat different path than universal joint 14. In the embodiment FIGS. 1 to 6, andi-friction bearing 23 also slides axially on coupling lever 22 because universal joint 21 moves along the straight bore 29, coupling lever 22 however on circular arc 36 concentric to axis 12 ot the manual shift lever 10, and thus on a somewhat different path than universal joint 21.

While the paths of motion of joint 14 lie along a cylindrical surface, the paths of motion of the knob 31 can lie along a spherical surface.

The paths of motion of universal joint 14 governed by the guide slot fixed in the housing and the guide pin on rotating shaft and fixed with respect to the rotating shaft are distorted only very little by the connecting linkage covered by the invention, essentially consisting of the bell crank 7, the connecting shaft 5 and the universal journaled manual shift lever 10, the shift pattern on knob 31 corresponds to a very large extent to the shift pattern of the guide pin in the guide slot.

The shift patterns of the knob 31 with respect to the shift patterns of the guide pin fixed in the rotating shaft in the guide slot fixed in the housing can easily be modified by a change of the slant angle of the slant guide 28 or 128 and/or the length of the lever arm 20 and/or the length of the lever arm 13 and/or the length of the coupling 4.

I claim:

1. A gear control device for an automotive vehicle comprising:
    a vertical gear-control shaft mounted for rotation about a first axis and axial displacement along said first axis to shift gears of the vehicle;
    a shaft lever fixed to said gear-control shaft and having an end spaced therefrom;
    a housing;
    a connecting shaft rotatable in said housing about a second axis offset from and generally transverse to said first axis and at a short distance therefrom;
    a bellcrank lever journaled by a fork-and-pin joint on one end of said connecting shaft for rotation about a third axis relative thereto, said third axis being generally perpendicular to said second axis, said bellcrank lever having two lever arms including a first lever arm extending transversely to said connecting shaft and parallel to said shaft lever and connected to said shaft lever and a second lever arm extending parallel to said connecting shaft;
    a manual shift lever journaled by a fork-and-pin joint on an opposite end of said connecting shaft for rotation about a fourth axis relative thereto, said fourth axis being generally perpendicular to said second axis and orthogonal to said third axis;
    a ball-and-socket joint connecting an end of a first of said arms with said end of said shaft lever, said ball-and-socket joint being slidable along one of said first arm and said shaft lever, said manual shift lever having a coupling arm; and
    means forming a ball-and-slantguide joint between the second of said arms of said bellcrank lever and said coupling arm of said manual shift lever.

2. The gear control device defined in claim 1 wherein said gear control shaft is mounted for rotation and axial displacement by at least one anti-friction bearing.

3. The gear control device defined in claim 1 wherein said connecting shaft is journaled on said unit by two sealed and permanently lubricated anti-friction bearings.

4. The gear control device defined in claim 1 wherein said manual shift lever and said bellcrank lever are journaled on said connecting shaft each with two sealed and permanently lubricated anti-friction bearings.

5. The gear control device defined in claim 1 wherein said ball-and-slantguide joint consists of an anti-friction bearing with a spherical outer race positioned on said manual shift lever, and a slantguide formed in said second lever arm of said bellcrank lever.

6. The gear control device defined in claim 1 wherein said slantguide includes a bore with a slot along the bore through which said manual shift lever projects, said outer race rolling along the bore on a hollow cylindrical surface.

7. The gear control device defined in claim 5 wherein said slantguide is a slot through which said manual shift lever projects, said outer race rolling along said slot on a planar surface thereof, a guard ring being provided to keep said bearing axially fixed to said manual lever.

* * * * *